Jan. 30, 1951 H. A. HOWELL 2,539,837

ROTATING MAGNETIC REPRODUCER

Filed Jan. 6, 1947

INVENTOR.
HUGH A. HOWELL
BY [signature]
ATTYS.

Patented Jan. 30, 1951

2,539,837

UNITED STATES PATENT OFFICE 2,539,837

ROTATING MAGNETIC REPRODUCER

Hugh A. Howell, Valparaiso, Ind., assignor to The Indiana Steel Products Company, Chicago, Ill., a corporation of Indiana Application January 6, 1947, Serial No. 720,456

2 Claims. (Cl. 274—4)

This invention relates to a magnetic reproducing device, and more particularly, to a rotating magnetic reproducer.

Various methods have been suggested in the past for changing pitch. Of such pitch-changing devices, one suggestion has been made for restoring pitch when a record is played back at a tape or wire speed which is slower than that at which the recording was made. Great difficulty has been experienced with such devices in obtaining any great reduction in speed, and difficulty has also been experienced in having the reproduction sound natural.

One of the principal features and objects of the present invention is to provide a novel pitch restoring magnetic reproducer in which a magnetic record may be played back at a speed substantially less than the speed at which it was recorded, and at the same time obtain a high degree of naturalness and fidelity of reproduction.

A further object of the present invention is to provide a novel recording technique in which a dual-track record is employed.

Another and further object of the present invention is to provide novel recording means in which successive heads on a rotating drum alternately engage parallel magnetic tracks on which a record has been simultaneously recorded, but in which the recordings on the parallel tracks is displaced longitudinally of each other by a predetermined amount.

Another and still further object of the present invention is to provide a novel method and means for magnetically recording and reproducing sound in which the speed at which the magnetic record member travels is different between the recording and reproducing.

The novel features which I believe to be characteristic of my invention are set forth with particularity in the appended claims. My invention itself, however, both as to its organization, manner of construction and method of operation, together with further objects and advantages thereof may best be understood by reference to the following description taken in connection with the accompanying drawing, in which:

Figures 1, 2:
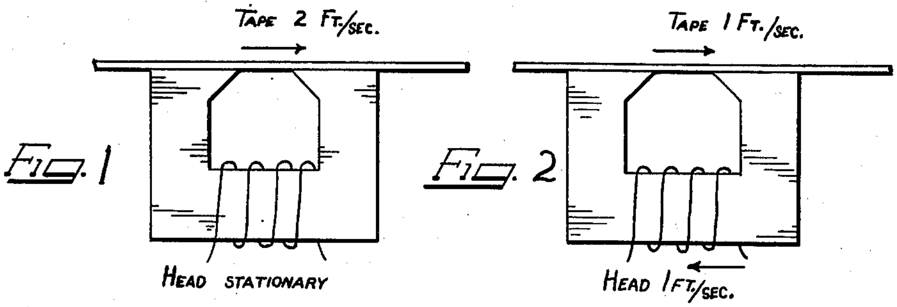
Figure 1 is a diagrammatic representation of a stationary magnetic reproducing head and a traveling record member.
Figure 2 is a diagrammatic representation of an electromagnetic reproducing head which is traveling in one direction at a predetermined speed, and in which a magnetic record member is passing over the head in the opposite direction at a predetermined speed thereby giving a relative speed which is the summation of the speed of each of the respective members.

Referring first to Figures 1 and 2 of the drawing, there is illustrated the effect of a relatively movable head. In Figure 1, the head is stationary, and the tape is moved to the right at a predetermined speed, such, for example, as two feet per second. In such an arrangement the recording and reproducing may be made on the same head and no change in pitch will be observed.

If, now, the tape on which a record was made at two feet per second is caused to move at one foot per second, there will be a very pronounced drop in pitch. For example, if a thousand cycle note were recorded at a tape speed of two feet per second and reproduced at one foot per second, the resulting pitch is only 500 cycles per second. In the case of speech, all of the naturalness and much of the intelligibility is lost when the recording is made at one-half to one-quarter of the recording speed.

Let us assume, however, that the recording head is moved in the opposite direction from the direction of movement of the tape at a speed sufficient to give a relative speed which is the same as the tape speed when the record was made. Thus, if a recording were made at two feet per second, and the reproducing device causes the tape to move one foot per second to the right, the recording head could be moved at one foot per second to the left and no change in pitch would be observed.

Figure 3:
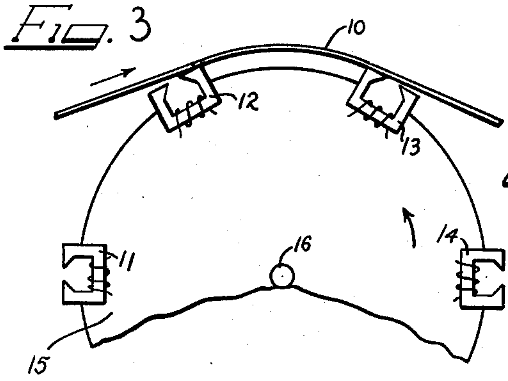
Figure 3 is a diagrammatic representation of a prior art type of structure in which an effort was made in the past to embody the technique of Figure 2 in a practical construction, and in which a single-track record member is engaged by a plurality of heads carried on a rotating drum.

It has been suggested in the past that advantage may be taken of this technique in an arrangement such as that shown in Figure 3 wherein a tape 10 is caused to travel from left to right and a plurality of heads 11, 12, 13 and 14 are mounted on a drum 15 for rotation about an axis 16 in a counter-clockwise direction.

The tape 10 in this prior art construction is a single-track tape, and the heads 11, 12, 13 and 14 are all mounted in a common plane. As will immediately occur to those skilled in the art, there is a serious disadvantage in this prior art construction in that the point on the tape 10 where the head 13 first begins to engage the tape is displaced from the point on the tape where the head 12 is leaving the tape. The result is that the head 13 plays over again the portion of the tape which has just been played by the head 12, but out of phase therewith in point of time due to the arcuate distance between the heads 12 and 13 and the linear speed of travel of the heads.

This displacement of phase will also be a function of the wave length of the recording signal. One of the principal features of the present invention is to provide a pitch restoring magnetic reproducer which eliminates this displacement or phase error.

Figure 5:
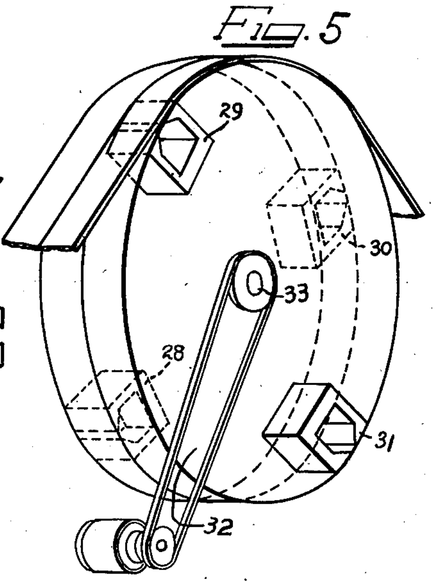
Figure 5 is a diagrammatic isometric view of a pitch restoring magnetic reproducer using a dual-track magnetic record member in accordance with the teachings of the present invention.
Figure 4:
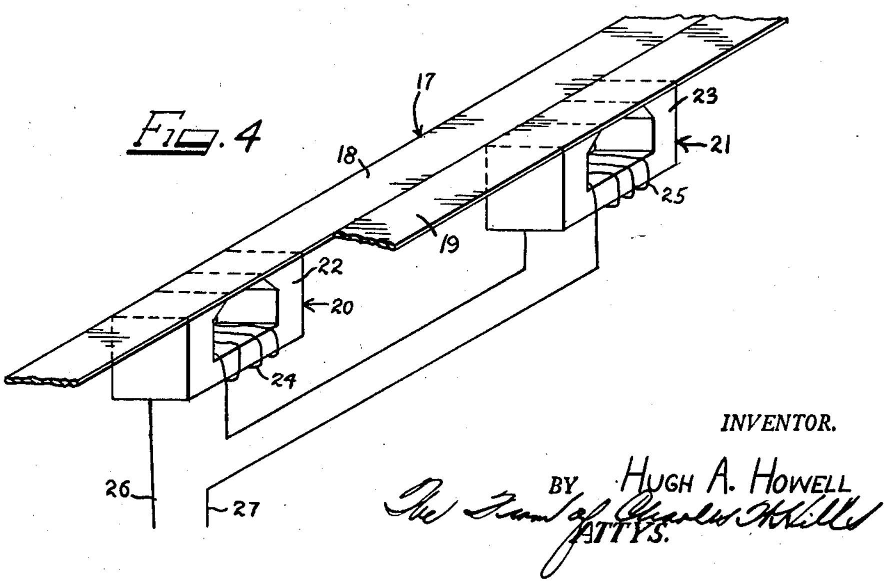
Figure 4 is a diagrammatic representation of a dual-track magnetic record member with a pair of magnetic recording heads arranged to make a recording thereon.

One embodiment of my novel invention is illustrated in Figures 4 and 5 of the drawing, Figure 4 being a representation of the manner in which the recording is made, and Figure 5 being a representation of the manner in which the reproduction is made.

As shown in Figure 4, a dual-track magnetic record member 17 is employed having a pair of parallel tracks 18 and 19. These tracks 18 and 19 are simultaneously recorded on by two magnetic recorder heads 20 and 21, respectively. The heads 20 and 21 include U-shaped core members 22 and 23 and a pair of signal coils 24 and 25. The latter are connected in series, and are arranged to be energized through conductors 26 and 27.

It will be observed that the magnetic recording head 20 is associated with the track 18, while the recorder head 21 is associated with the track 19. It will also be observed that the two recording heads 20 and 21 are displaced longitudinally with respect to each other along the longitudinal axis of the tape.

The particular spacing of the recording heads 20 and 21 will be a function of the arcuate spacing of the reproducing heads 28, 29, 30 and 31 on the drum 32 carried on the rotatable drive shaft 33 which may be powered by any suitable means such as a motor 35 mechanically connected thereto (see Figure 5).

It will be observed that in the reproducing device embodying the principles of the present invention, the reproducing heads are arranged around the periphery of the drum 32 in such a manner that they alternately engage the tracks 18 and 19 of the tape 17. Thus, when four reproducing heads are used on the drum, such as the heads 28, 29, 30 and 31, the heads 28 and 30 are arranged to engage the track 18, while the heads 29 and 31 are arranged to engage the track 19.

By appropriately spacing the recording heads 20 and 21 during the recording process, it will readily be observed that as the head 29 is leaving the tape 19, the head 30 is beginning to engage the track 18. Due to the displacement of the recording heads 20 and 21, however, there is no phase error in the output of this system as there was in the prior art system.

It will furthermore be observed that as the intensity of the signal picked up by one head is increasing, the intensity of the signal picked up by the other head is decreasing. Thus, the total output of the combined heads in the reproducing device may be substantially uniform for any given level of input signal.

It will thus be seen that a pitch restoring magnetic reproducing device has been provided which can be used with music and speech as well as with telegraphic signals, a feature which was not possible with the prior art construction. Thus, with the present arrangement, the tape 17 may be driven at two feet per second, by way of example, during the recording process, and later played back at one foot per second by causing the drum 32 to rotate at a speed which will provide a linear speed at the point of tangency of the outer surface of the drum equal to one foot per second in the opposite direction to the direction of movement of the tape.

While I have shown a particular embodiment of my invention, and described a particular method of operation, it will, of course, be understood that I do not wish to be limited thereto, since many modifications may be made, and I, therefore, contemplate by the appended claims to cover all such modifications as fall within the true spirit and scope of my invention.

I claim as my invention:

1. The method of magnetic recording and reproducing which includes making identical complete recordings simultaneously on two magnetic tracks with a predetermined phase displacement between the two tracks, then passing said tracks respectively over two groups of magnetic reproducing heads and simultaneously moving said heads in an opposite direction to the direction of motion of said tracks and with the heads of one group staggered with respect to the heads of the other group.

2. The method of magnetic recording and reproducing which includes making identical complete recordings simultaneously on two magnetic tracks with a predetermined phase displacement between the two tracks, then passing said tracks respectively over two groups of magnetic reproducing heads, simultaneously moving said heads in an opposite direction to the direction of motion of said tracks with the heads of one group staggered with respect to the heads of the other group, and causing the reproducing heads successively to come into contact with said tracks with a time displacement similar to said phase displacement of said recordings on said two tracks.

HUGH A. HOWELL.

REFERENCES CITED

The following references are of record in the file of this patent:

UNITED STATES PATENTS

| Number | Name | Date |
|---|---|---|
| 1,825,441 | Cawley | Sept. 29, 1931 |
| 2,170,751 | Gabrilovitch | Aug. 22, 1939 |
| 2,352,023 | Schuller | June 20, 1944 |